INVENTOR.
RICHARD W. AHRONS
BY Samuel Cohen
Attorney

INVENTOR.
RICHARD W. AHRONS
BY Samuel Cohen
Attorney

INVENTOR.
RICHARD W. AHRONS
BY
Samuel Cohen
Attorney

INVENTOR.
RICHARD W. AHRONS
BY Samuel Cohen
Attorney 3,452,333

CRYOELECTRIC MEMORIES

Richard W. Ahrons, Somerville, N.J., assignor to Radio Corporation of America, a corporation of Delaware Filed Nov. 2, 1964, Ser. No. 408,009
Int. Cl. G11b 5/84
U.S. Cl. 340—173.1 9 Claims

ABSTRACT OF THE DISCLOSURE

A plurality of superconducting loops, each comprising two paths. One path is a preferred path for current flow. Persistent current is established in a loop by applying a current, in parallel, to the two paths, employing a magnetic field to drive only the first path normal, then removing the magnetic field to permit the first path to return to the superconducting state, then removing the applied current. The loops may be arranged perpendicularly of a ground plane with the first path of each loop located between the second path and the ground plane.

This invention relates to new and improved cryoelectric memories.

A known superconductor memory includes a substrate and a thin film formed of superconductor material on the substrate. X and Y drive lines are located over the substrate and the areas in the thin film located beneath the cross-over points of the drive lines are storage locations. Information is written into the memory by applying coincident write currents to selected X and Y drive lines. The magnetic fields associated with these currents cause a storage location to be driven "normal" (driven to the resistive condition), and, when the write currents are removed, persistent circulating currents are stored at that storage location. The persistent current paths lie in the superconductor film and are parallel to the substrate.

An object of the present invention is to provide cryoelectric memories of relatively high bit-packing density.

Another object of the invention is to provide cryoelectric memories which are relatively simple to construct.

Another object of the invention is to provide improved word-organized memories which operate well even with relatively wide variation in the operating parameters of the individual memory elements.

Another object of the invention is to provide cryoelectric memories of relatively high speed.

The memories of the present invention include a substrate and a plurality of closed superconductor current paths, each such path extending substantially perpendicularly to the substrate. The memories also include means for selectively inducing persistent currents into the loops and means for selectively interrogating the loops.

The invention is discussed in detail below and is shown in the following drawings, of which:

Figure 1:
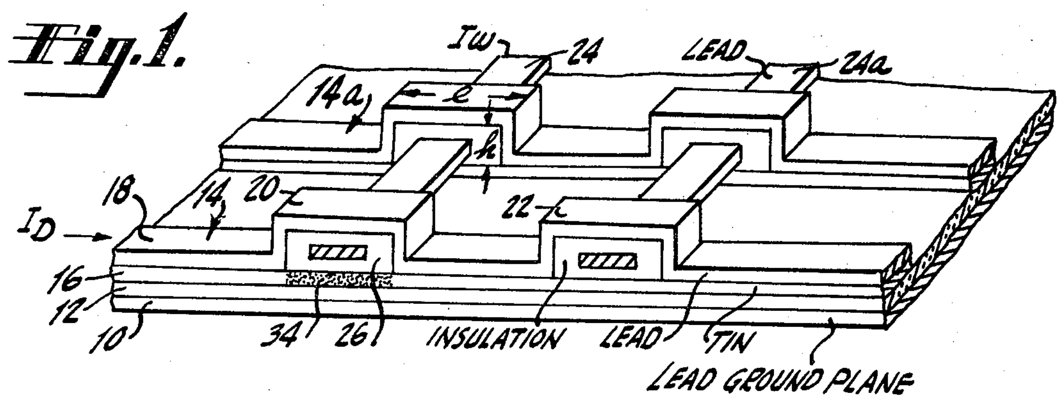
FIGURE 1 is a perspective view of a 2 x 2 memory array of one embodiment of the invention.

The showings in the various figures above are somewhat idealized for the sake of clarity. It is to be understood that the various layers of metal shown are in the form of thin films perhaps several thousand angstroms thick (specific values, by way of example, are given later). It is also to be understood that in view of this thin film structure, edges and corners are not as square as shown in the drawings.

In the dicussion which follows, a low temperature environment, such as a few degrees Kelvin, is assumed. The means for providing this environment is well known and need not be discussed here.

The 2 x 2 array of FIGURE 1 includes a lead ground plane 10 covered by an insulating substrate 12, such as a thin silicon monoxide layer. The digit lines 14, **14*a* are located on the substrate. Each such digit line includes a tin strip 16, and a lead strip 18. The lead strip is in conductive contact with the tin strip over portions of its length and is spaced and insulated from the tin strip over other portions of its length. The spaced portions such as 20 and 22 (hereafter termed "bridges") form with the tin strip portions 34 closed loops or paths in which persistent currents may be induced, as discussed later. The word lines comprise strips of lead 24 and 24*a*. These strips pass beneath the respective bridges and are insulated therefrom and from the tin strips by insulation 26**. (The alternative tin strip construction of FIGURE 5 may be used instead of the construction shown.)

Figure 3:
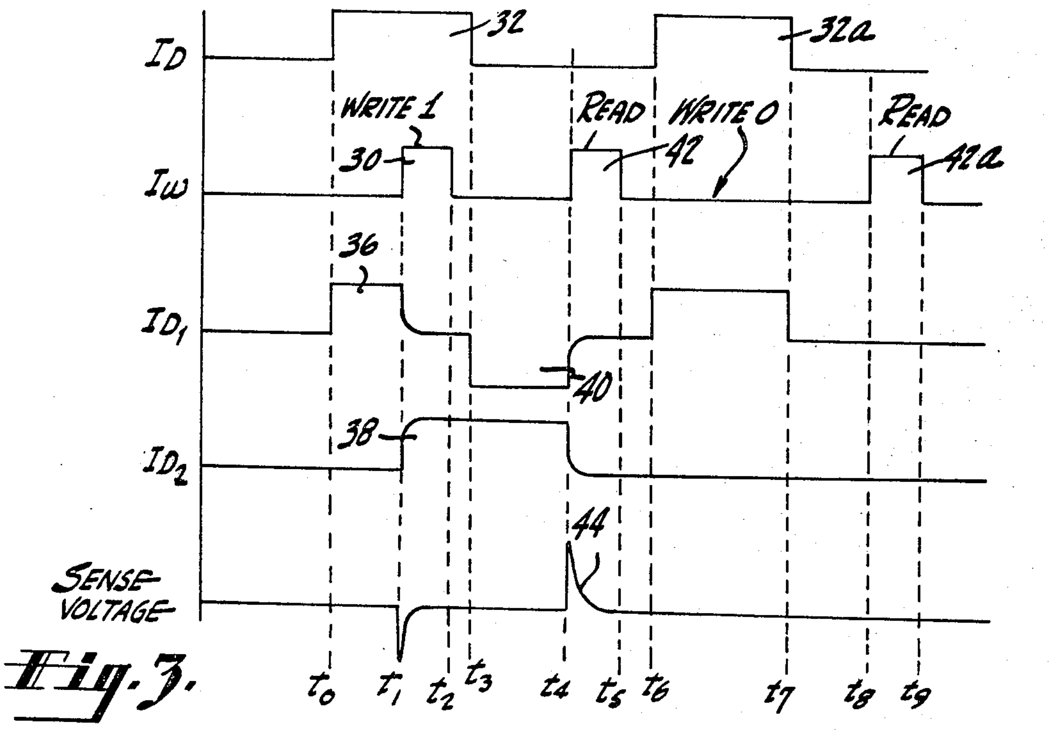
FIGURE 3 is a drawing of waveforms to help explain the operation of the memory of FIGURE 1.
Figure 2:
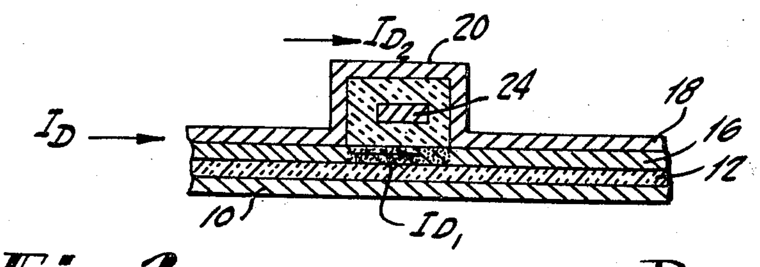
FIGURE 2 is a cross-section through one of the memory elements of FIGURE 1.

The operation of the memory of FIGURES 1 and 2 is depicted in FIGURE 3. It may be assumed that there are no circulating currents present in the memory initially. If now a digit current pulse $I_D$ is applied to a digit line, such as 14, this current flows mainly on the underside of the tin strip 16 in view of the presence of the lead ground plane. The magnetic field due to this current concentrates in the area between the tin strip and the lead ground plane. In practice, the digit current amplitude is chosen to be less than the "critical current" of the tin strip, so that the tin remains in a superconducting state.

In order to write a bit into a memory location as, for example, the location at bridge 20 of FIGURE 1, a word current pulse 30 (FIGURE 3) is applied to the appropriate word conductor 24 concurrently with the digit current pulse 32. The amplitude of the word current pulse is so chosen that the combined magnetic field resulting from the concurrent currents $I_W$ and $I_D$ is sufficient to drive the portion 34 of the tin strip to the normal condition, but insufficient to drive the bridge 20 to the normal condition.

As the bridge 20 is superconductive and the tin strip is now normal, the current $I_D$ steers substantially entirely into the bridge 20. This is shown more clearly in FIGURE 3, where the current $I_{D_1}$ is the current passing through the tin strip and the current $I_{D_2}$ is the current passing through the bridge 20. The normal tin strip portion 34 is indicated schematically in FIGURES 1 and 2 by dots.

At time $t_2$, after the tin strip portion 34 has been driven normal, as discussed above, the write current pulse 30 is terminated. For reasons having to do with conservation of energy, this has essentially no effect on the current division previously established, even though the tin strip portion 34 returns to the superconducting state. Thus, as can be seen in FIGURE 3, during the interval $t_2$ to $t_3$, the current $I_{D_1}$ remains essentially zero, and the current $I_{D_2}$ remains at its previous value. Next, at time $t_3$, the digit current $I_D$ is terminated. This causes a persistent current to be established in the loop 20, 34. This is shown more clearly in FIGURE 3, where it may be observed that during the interval $t_3$ to $t_4$, the current $I_{D_2}$ flows in one direction through the bridge portion 20, and the corresponding current $I_{D_1}$ (shown at 40) flows in the opposite direction through portion 34.

Information may be read out of the memory of FIGURE 1 by applying a read current pulse, as shown at 42 in FIGURE 3, to a word line in the absence of a digit current pulse on the digit line. The application of a read current pulse, such as 42, is effective to read an entire word of information out of the memory at one time. If a memory location is storing a persistent current, the magnetic field due to the current pulse 42 causes the tin strip portion of that memory location to be driven normal. This is shown in FIGURE 3 as an interruption of current $I_{D_1}$ and a corresponding interruption of current $I_{D_2}$ during the interval $t_4$ to $t_5$. When the tin strip is driven normal, the bridge 20 is still superconductive, and its current attempts to find some path through which it can discharge. In this respect, the bridge 20 acts like a storage element, such as an inductor, which, when the current flowing through it tends to terminate, supplies energy in a sense to tend to cause the current to continue flowing. The current discharge path is the resistive tin strip portion 34, and the flow of current therethrough causes a voltage to develop across the tin strip portion 34. This voltage is the sense voltage 44 shown in FIGURE 3. The sense voltage is available across a pair of output terminals, such as shown at 46 in FIGURE 4, and may be detected by a sense amplifier (not shown) connected to these terminals.

FIGURE 3 shows that a voltage pulse also appears across terminals 46 when the tin strip is initially driven normal (at time $t_1$). However, this pulse is of opposite polarity to pulse 44 and may easily be discriminated against by appropriately biasing the sense amplifier.

The read-out of the memory of the invention is destructive. In other words, upon termination of the read-out, the persistent circulating current is no longer present. This is shown in FIGURE 3 by the absence of currents $I_{D_1}$ and $I_{D2}$ during interval $t_4$–$t_6$.

FIGURE 3 also illustrates the writing of the bit "0" into the memory. Storage of a "0" corresponds to no circulating current at a memory location. A digit current pulse **32*a* is applied to one of the digit lines, but no current is applied to the corresponding write line. As a result, the tin strip corresponding to 34 carries substantially all of the digit current $I_D$ and is not driven to the normal condition. Therefore, when the digit current pulse 32*a*** is terminated, current $I_D$ is also terminated and, since in the process nothing was driven normal, no persistent current is induced in the storage location.

The second read-out period is interval $t_8$ to $t_9$ of FIGURE 3. A read current pulse **42*a*** is applied to a word conductor. However, since the storage location in question is not storing any persistent current, the read-out pulse does not discharge any stored current. Accordingly, no sense voltage is induced at time $t_8$. The absence of a sense voltage corresponds to storage of a "0".

While in the embodiment of the invention illustrated and discussed, storage of a "1" is represented by circulating current and storage of a "0" is represented by no circulating current, the memory can be operated in another way. Storage of a "0" can instead be represented by a persistent current in a direction opposite to that indicative of storage of a "1". A circulating current of opposite direction may be induced by changing the polarity of the digit and write pulses, that is, making them negative rather than positive as shown. The readout of a circulating current of such opposite polarity will result in the production of a sense voltage opposite in polarity to the sense voltage shown at 44. The sense amplifier (not shown) is preferably gated "on" by an appropriate gating pulse during the read intervals and "off" during the remainder of the time to discriminate against voltages appearing at terminal 46 during the write intervals, in accordance with standard practice.

Figure 4:
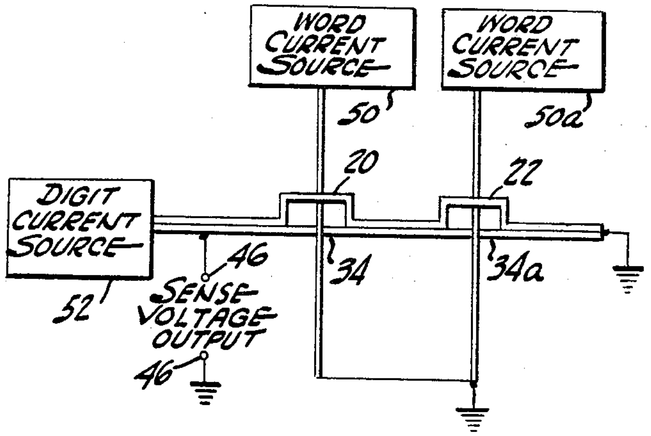
FIGURE 4 is a block and schematic circuit diagram of a 1 x 2 memory array and associated circuits.

FIGURE 4 illustrates some of the circuits associated with a memory such as shown in FIGURE 1. To keep the drawing simple, only a 1 x 2 memory is shown. The blocks 50 and **50*a* represent word current ($I_S$) sources and the block 52 represents the digit current ($I_D$) source. The memory cells are shown at 20, 34 and 22, 34*a***. The output sense voltage is available across the memory cells. There may be a separate word current source for each line, as shown. However, it is preferable to use a single word current source and a selection tree as, for example, one formed of cryotrons, for steering the word current to the desired one of the plurality of word lines.

Some typical dimensions of memory cells such as shown in FIGURE 1 are as follows:

| | | |
|---|---|---|
| Film thicknesses | A | 1,000 to 3,000 |
| Length of bridge L | in | 0.001 to 1.0 |
| Height of bridge H [1] | A | 5,000 to 150,000 |
| Sense signal amplitude | microvolts | 10 to 5,000 |

[1] A number of different memories have been operated using different bridge heights.

A memory cell having dimensions H=128,000 A. and L=0.2 in. produced a sense voltage output of about 1,000 microvolts.

Figure 5:
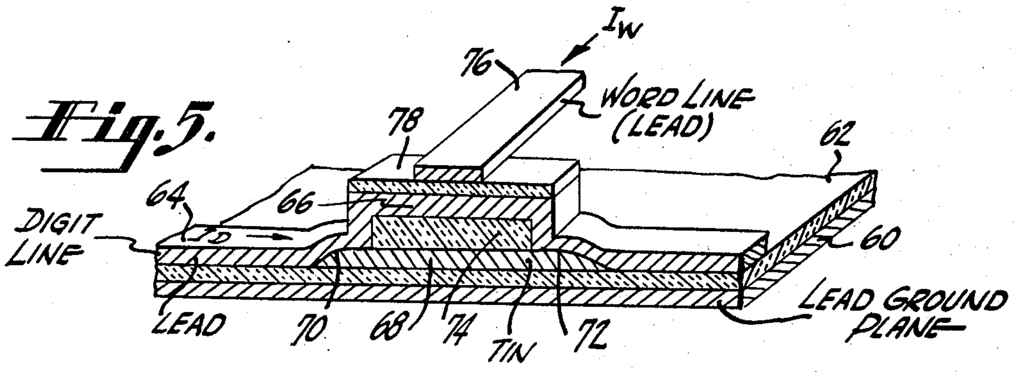
FIGURE 5 is a perspective view, partially in section, of a second type of memory element according to the invention.

A modified form of the memory cell according to the invention is shown in FIGURE 5. It includes a lead ground plane 60 covered by an insulating substrate 62 similarly to the ground plane and substrate of the previously described arrangement. A digit line 64 is located on the substrate. This line is in the form of a bridge at 66. Beneath the bridge 66, there is a strip-shaped length of tin 68 which is in superconductive contact with the digit line at 70 and 72. (The alternative construction of FIGURES 1 and 2, in which the tin strip extends under a greater portion of the lead strip is also possible.) The insulation between the bridge 66 and the strip 68 is shown at 74. The word line 76, however, rather than lying between the bridge 66 and the tin strip 68, lies over the bridge and is insulated therefrom by insulation strip 78.

The operation of the memory of FIGURE 5 is quite analogous to that of the memory of FIGURE 1. Information is written into the memory by the concurrent application of a digit current $I_D$ and a word current $I_W$, as illustrated in FIGURE 3 at 32 and 30. The resultant magnetic field is of sufficient magnitude to drive the tin strip 68, located beneath the bridge 66, to its normal state, but insufficient to drive the bridge 66 normal. The digit current $I_D$ thereupon steers into the bridge 66. When the digit and the word currents $I_D$ and $I_W$ are removed, a circulating current remains in the loop 66, 68.

Read-out of the information stored in the memory of FIGURE 5 is also analogous to the read-out arrangement of the memory of FIGURE 1. As this has already been discussed, it need not be repeated here.

The memories discussed so far are of the so-called "word organized" type. In other words, in these memories a plurality of bits are written into the memory at one time and, correspondingly, a word, that is, a plurality of bits, is read out of the memory in parallel.

Figure 6:
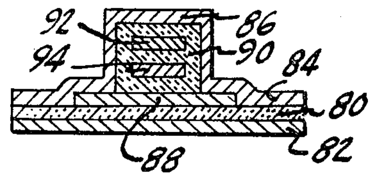
FIGURE 6 is a cross-sectional view of another form of memory element according to the invention.

A bit-organized memory is illustrated in FIGURES 6 and 7. The cross-sectional view of FIGURE 6 shows an insulating substrate 80 located on the lead ground plane 82 and a lead digit line 84 located on the substrate. This line, as in the previous memories, is in the form of a strip and is formed as a bridge at portion 86. A tin strip 88 is joined to the lead at its opposite ends and is spaced from the bridge portion 86 by insulation 90. X and Y conductors in the form of lead strips 92 and 94, respectively, are located beneath the bridge 86 and are insulated from one another and from the bridge 86 and tin strip 88.

A 3 x 3 array of memory elements as described above is shown in the plan view of FIGURE 7. The X conductors corresponding to 92 are shown at $X_1$, $X_2$ and $X_3$. The Y conductors corresponding to 94 are shown at $Y_1$ through $Y_5$. The lead strips corresponding to 84 are shown at **84*a*, 84*b* and 84*c*. These strips are connected to one another to form a continuous conductor which links all memory locations. The bridge areas are shown at 86*a*–86*i***.

Figure 7:
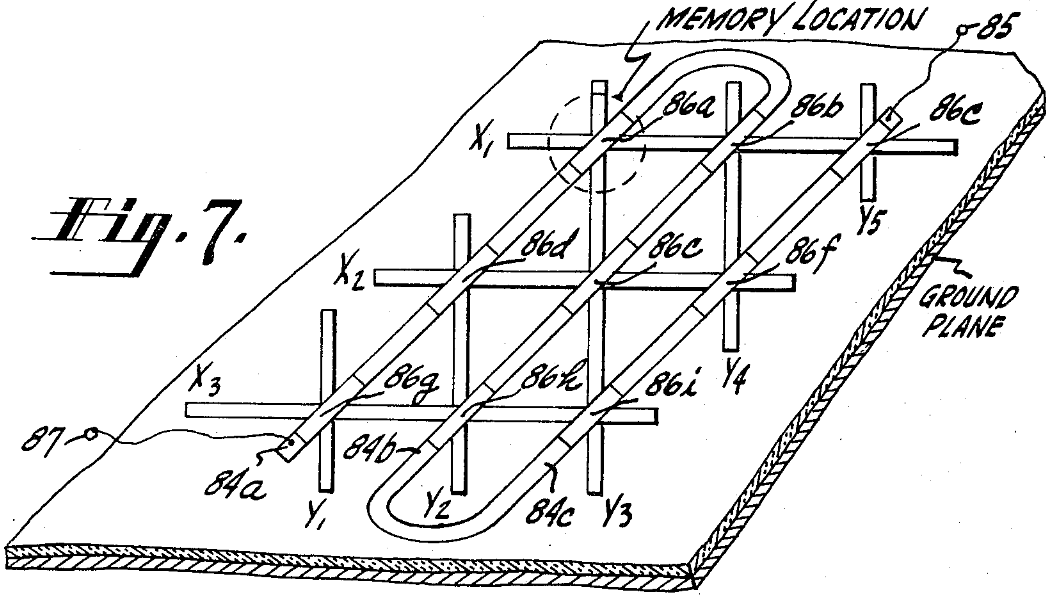
FIGURE 7 is a plan view of a 3 x 2 memory array employing memory elements such as shown in FIGURE 6.

The operation of the memory of FIGURE 7 is somewhat similar to that of the memories already discussed. Digit current $I_D$ is applied to a particular one of the lead strips, such as **84*a*. Concurrently so-called "half-select" current pulses are applied to a selected X conductor and a selected Y conductor, as for example $X_2$ and $Y_2$. The magnetic field which results at the memory location through which all three currents pass, namely location 86*d*, is of sufficient magnitude to drive the tin strip beneath the bridge portion 86*d* normal. Thereafter, the X and Y drive currents and then the digit current $I_D$ are removed, and a circulating persistent current remains at location 86*d*. This circulating current occurs in a loop corresponding to 86, 88** of FIGURE 6.

Read-out of the memory of FIGURE 7 may be achieved in a manner similar to that already discussed, but using coincident currents. For example, read-out of location **86*d* requires a "half-select" current pulse applied to lead $X_2$ concurrently with the application of a half-select current pulse to lead $Y_2$. The sense signal may be observed across the continuous winding 84*a*, 84*b*, 84*c* at, for example, output terminals 85, 87**.

Figure 9:
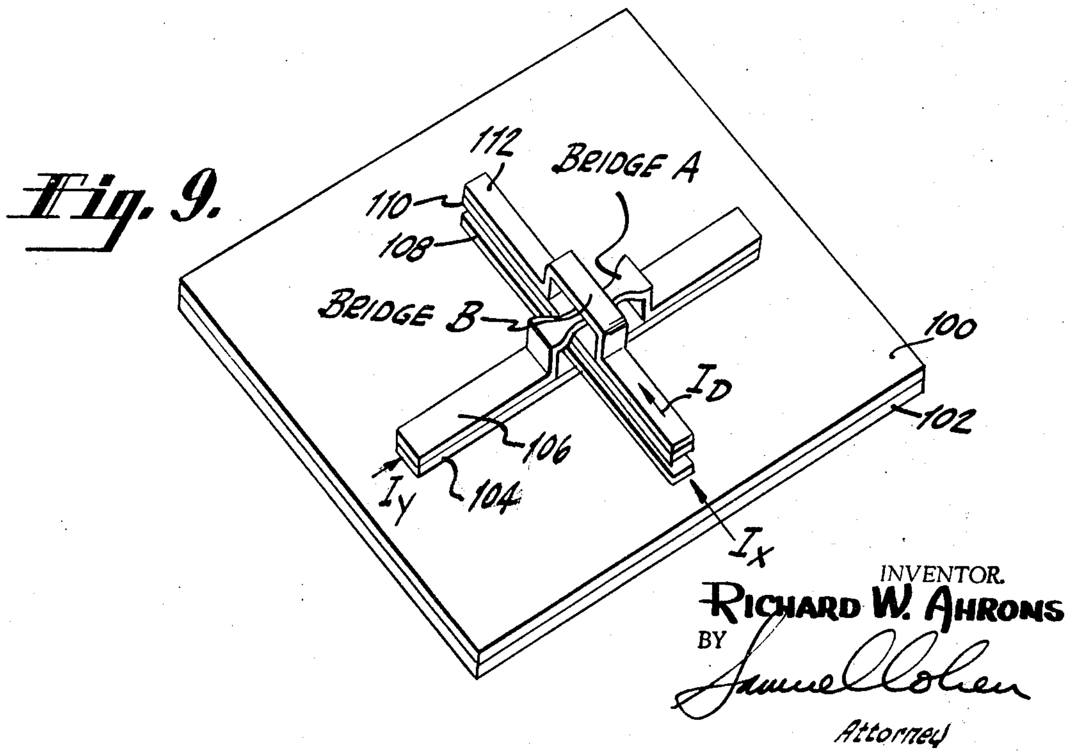
FIGURE 9 is a perspective view from a different angle of the memory element of FIGURE 8.
Figure 8:
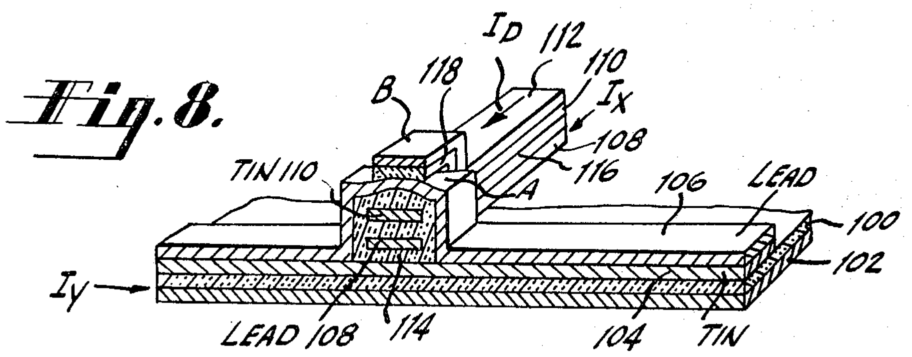
FIGURE 8 is a perspective view, partially in section, of another form of memory element according to the invention.

Another form of memory cell according to the invention is shown in FIGURES 8 and 9. It includes an insulating substrate 100 on a superconductor ground plane 102. A tin strip 104 is located on the substrate, and a lead strip 106 is located over the tin strip. The lead strip is formed as a bridge A along one portion of its length. The control strip for bridge A is shown at 108.

A second bridge cell arrangement is linked with the first bridge. The second arrangement includes a tin strip 110 and a lead strip 112 lying over the tin strip. The tin strip passes beneath bridge A and is insulated therefrom and from the lead strip 106 by insulation 114. This insulation continues beyond the bridge A as insulation 116 and insulates the lead strip 106 from the tin strip 110 along the entire length of these strips. The lead strip 112 is formed as a bridge B which passes over bridge A and is insulated therefrom by insulation layer 118. The bridge A may be of somewhat restricted cross-section, as shown, in order to improve the gain of the device, as discussed shortly.

Figure 10:
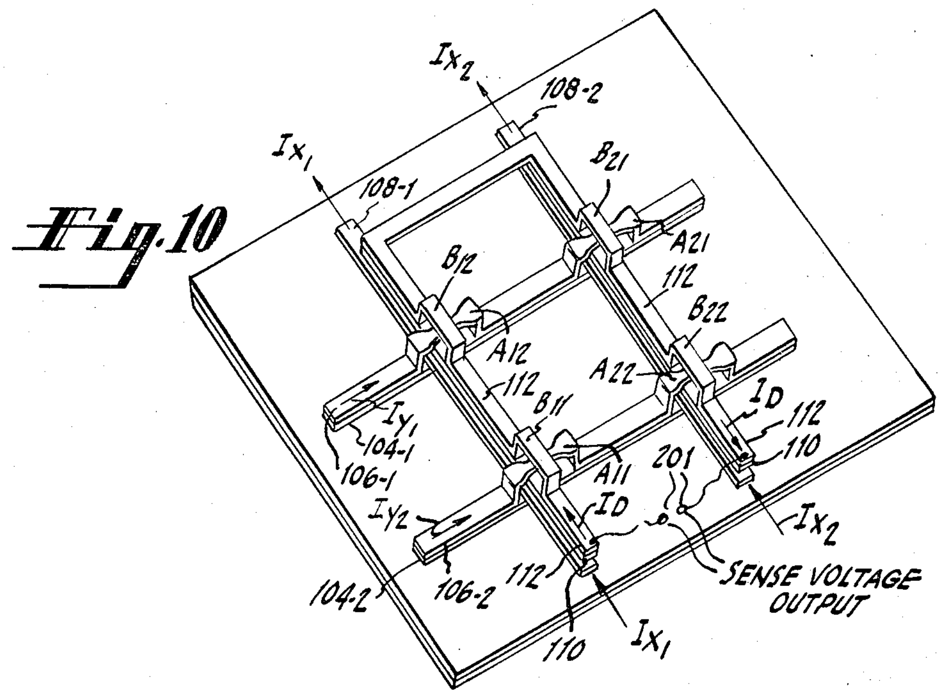
FIGURE 10 is a perspective view of a 2 x 2 array of elements such as shown in FIGURES 8 and 9.

As may be seen more clearly in the 2-by-2 array of FIGURE 10, the line 110, 112 links each and every location of the memory. This line is somewhat analogous to the sense line of more conventional memories.

In the operation of the memory of FIGURE 10, a current $I_Y$ is initially sent down a tin strip such as 104–1. As in the previous circuits, this current travels mainly on the underside of the tin strip because of the presence of the ground plane. A current pulse such as $I_{x2}$ is now applied to a lead strip such as 108–2. The current magnitude is such that it produces a magnetic field of sufficient intensity to drive a portion of the tin strip 104–1, beneath the bridge $A_{21}$, normal. The current $I_{Y1}$ thereupon steers through bridge $A_{21}$. In view of the restricted cross-section of bridge $A_{21}$, the current density passing through bridge A is relatively high, and the magnetic field produced by this current is relatively high.

If now a current $I_D$ is applied to the tin strip 110, this current will steer mainly into the bridge $B_{21}$. The current first attempts to pass through the portion of tin strip 110 beneath $B_{21}$. However, the combined magnetic field due to the current passing through the tin strip 110 and due to the current passing through bridge $A_{21}$ is of sufficient magnitude to drive the portion of the strip 110 beneath the bridge $A_{21}$ normal.

Completion of the storage cycle, that is, of the "write in" cycle, requires the various currents to be removed in a particular order. First the current $I_{Y_1}$ is removed. This terminates the current passing through bridge $A_{21}$. Since the current $I_{X_2}$ is still present, the tin strip portion of 104–1 beneath the bridge $A_{21}$ is still in the normal condition, so that no current passes through it either. The current $I_{X_2}$ is now terminated, and this permits the tin strip 104–1 to return to the superconducting condition. However, as there is no current present in the bridge $A_{21}$ at the time the strip 104–1 returns to the superconducting state, no persistent current is stored in the loop $A_{21}$, 104–1. The current $I_D$ still flows in bridge $B_{21}$. Now, the current $I_D$ is terminated, and this causes persistent current to be established in bridge $B_{21}$.

A memory location may be read out by applying a current $I_X$ in coincidence with a current $I_Y$. For example, referring to FIGURE 10, if a current $I_{X_2}$ is applied concurrently with a current $I_{Y_1}$, the tin portion of line 110 beneath the bridge $B_{21}$ is driven normal. This causes a sense voltage to appear across the bridge $B_{21}$. This sense voltage may be detected by a sense amplifier (not shown) connected to the sense voltage output terminals 201 of the memory.

Figure 11:
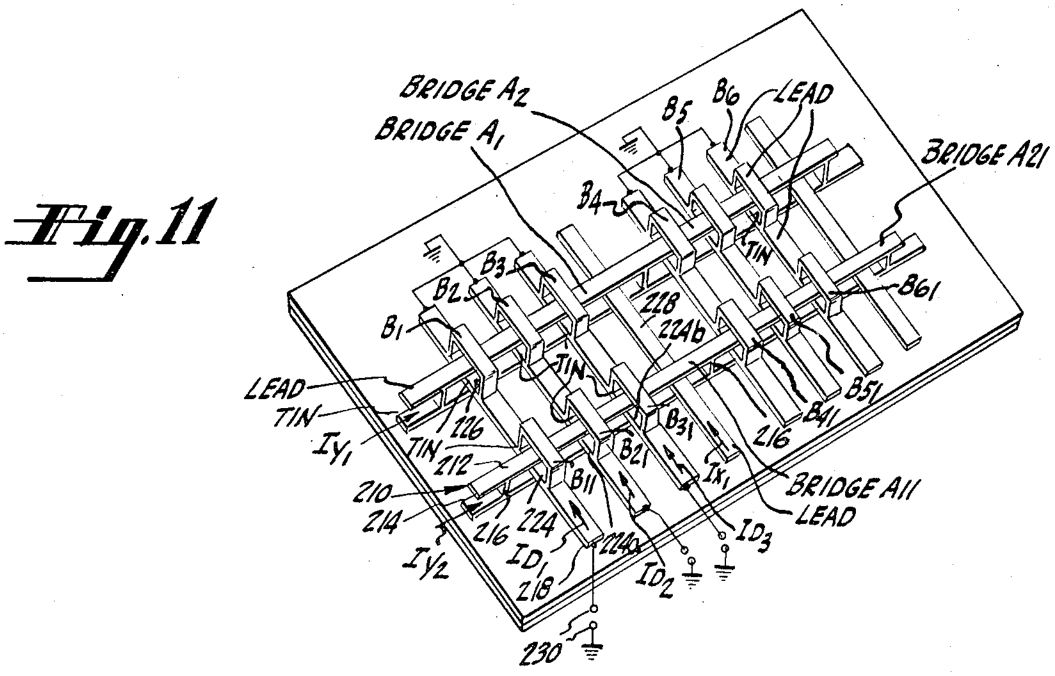
FIGURE 11 is a perspective view of another form of memory according to the invention.

A modification of the memory of FIGURE 10 is shown in FIGURE 11. Here, each word line, such as 210, is subdivided into a plurality of word storage locations. In the example chosen for illustration, each word has three bits.

In the memory of FIGURE 11, each word line 210 includes an upper lead strip 212 and a lower tin strip 214. The strips are joined to one another by spaced lead portions 216.

A plurality of bit lines, such as 218, 220 and 222, cross the word lines. The lines are formed of lead over the major portion of their extent, but are formed of tin in the regions such as 224, 226 and so on, beneath the B bridges. In addition to the bit lines, each bridge A of the memory has passing beneath it a lead drive lead, such as 228.

In the operation of the memory of FIGURE 11, a word current such as $I_{Y_2}$ is initially passed down one of the word lines. This current initially travels on the tin strip 214. Then, an X current is passed down one of the drive leads, such as 228. This current causes a portion of the tin strip 214 immediately adjacent to the drive line to be driven normal. When this occurs, the current in line 214 steers through lead portion 216 and into the lead bridge $A_{11}$. Now bit currents, such as $I_{D_1}$ and $I_{D_3}$, may be applied to the conductors 218 and 222, respectively. These steer into the bridges $B_{11}$ and $B_{31}$, respectively, since the current passing through bridge $A_{11}$ has driven the tin strip portions **224, 224*a* and 224*b*** normal.

The various currents are now removed in the following order: First, the current $I_{Y_2}$ is terminated; then, the current $I_{Y_1}$ is terminated; and then the $I_D$ currents are terminated. Upon termination of the currents $I_{D_1}$ and $I_{D_3}$, persistent circulating currents are established in the loops $B_{11}$, 224 and $B_{31}$, **224*b*. These circulating currents correspond to storage of a "1". No circulating current is established in the loop $B_{21}$, 224*a*, as no current $I_{D_2}$ was applied to bit lead 220. Accordingly, the loop 224*a***, $B_{21}$ stores a "0".

The memory may be read out by applying coincident read currents such as $I_{X_1}$ and $I_{Y_2}$. These cause the tin strip portions 224, 224a and 224b to be driven normal, and output sense signals appear at terminals 230 and 232.

What is claimed is:

1. A memory comprising, in combination, a superconductor ground plane;

an insulating substrate on the ground plane;

a plurality of superconductor loops on the substrate which extend perpendicularly from the substrate, each said loop comprising a first current path lying on the substrate formed of a material having a relatively low critical field, and a second current path lying on the first current path formed of a material having a relatively high critical field;

means for applying write current, in parallel, to the two paths of selected loops, at a point at which these paths join, said current, in each case, flowing mainly in the first current path;

means for applying a magnetic field to said first and second current paths of selected loops for causing, in each case, the first path to be driven to the resistive state while the second path remains superconducting; and means for terminating first the application of the magnetic field and then the application of said write current to establish persistent currents in said selected loops.

2. A memory comprising, in combination, an insulating substrate;

a pair of parallel current paths lying one over the other and forming together a superconductor loop on the substrate which extends substantially perpendicularly from the substrate, the first of said paths requiring a substantially greater value of magnetic field to drive it normal than the second of said paths;

means for applying a current, in parallel to the two paths of said loop at a point at which said paths join, which current initially flows mainly through said first path; and means in operative relationship with said loop for applying a magnetic field thereto of sufficient magnitude to drive said first path normal, causing said current to steer into said second path, whereby when said magnetic field is removed and the applied current terminated, a persistent circulating current is established in said loop.

3. A memory element comprising, in combination, a superconductor ground plane;

an insulating substrate on the ground plane;

a first superconductor strip on the substrate;

a second superconductor strip lying over the first superconductor strip which is joined to the first strip at two spaced regions along its extent and which is insulated from the first strip in the region between the two spaced regions, whereby the two strips form a closed loop, said second strip requiring a substantially greater magnetic field to drive it normal than said first strip;

means for applying a current to the two strips, at a region thereof at which they are joined, of insufficient magnitude to drive the first strip normal, whereby said current flows mainly through said first strip;

a third superconductor strip extending at an angle to and insulated from the first and second strips located adjacent to the first and second strips between the regions where they are joined;

means for applying a current to the third strip for producing a magnetic field of sufficient magnitude to drive the current-carrying first strip normal but of insufficient magnitude to drive the second strip normal, whereby the current in the first strip steers into the second strip; and means for terminating the current applied to said third strip and then terminating the current applied to said two strips, whereby a persistent current is established in said closed loop.

4. A memory element comprising, in combination, a superconductor ground plane;

an insulating substrate on the ground plane;

a first superconductor strip on the substrate;

a second superconductor strip lying over the first superconductor strip joined to the first strip at two spaced regions along its extent and insulated from the first strip in the region between the two spaced regions, whereby the two strips form a first closed loop, said second strip requiring a substantially greater magnetic field to drive it normal than said first strip; and third and fourth superconductor strips insulated from the first and second strips and joined to one another at two spaced regions along their extent to form a second closed loop which links the first closed loop, said fourth strip passing outside of the first and second strips and requiring a substantially greater magnetic field to drive it normal than said third strip.

5. A memory element comprising, in combination;

a superconductor ground plane;

an insulating substrate on the ground plane;

a first superconductor strip on the substrate;

a second superconductor strip lying over the first superconductor strip joined to the first strip at two spaced regions along its extent and insulated from the first strip in the region between the two spaced regions, whereby the two strips form a first closed loop, said second strip requiring a substantially greater magnetic field to drive it normal than said first strip;

third and fourth superconductor strips insulated from the first and second strips and joined to one another at two spaced regions along their extent to form a second closed loop which links the first closed loop, said fourth strip passing outside of the first and second strips and requiring a substantially greater magnetic field to drive it normal than said third strip; and a fifth superconductor strip which also passes through the first closed loop.

6. In a superconductor memory, in combination:

an array of loops of superconductor material in which persistent currents may be stored, each loop having two parallel superconductor paths, one of said paths exhibiting a substantially higher impedance to current flow than the other when current is applied in parallel to said two paths;

a plurality of pairs of drive leads coupled to said loops for applying magnetic fields to said loops, each loop being coupled to a different pair of said drive leads;

a third lead directly connected to all of said loops for applying a current in parallel to the two paths of each loop; and means coupled to a selected pair of drive leads and to said third lead for concurrently applying current to said three leads of a combined magnitude which is sufficient to drive a portion of the loop coupled by said three leads to its normal state, then removing first the current applied to said selected pair of drive leads, then the current applied to said third lead, whereby a persistent current is established in said loop.

7. A superconductor memory element comprising, in combination:

a loop of superconductor material in which a persistent current may be stored, said loop having two paths one of which is a preferred path for the flow of current when a current is applied, in parallel, to said two paths;

a pair of drive leads coupled to the loop in magnetic field coupling relationship with the loop;

a third lead directly connected to said loop for applying a current in parallel to said two paths making up said loop; and means coupled to said three leads for concurrently applying current thereto of a combined magnitude sufficient to drive a portion of said preferred path of said loop to its normal state, then removing first the currents applied to the two drive leads then the current applied to said third lead, whereby a persistent current is established in said loop.

8. A memory as set forth in claim 7, wherein said means for concurrently applying currents applies currents of substantially equal magnitude to the pair of drive leads.

9. A memory as set forth in claim 7, wherein said pair of drive leads passes through said loop of superconductor material.

References Cited

UNITED STATES PATENTS

| | | | |
|---|---|---|---|
| 3,196,408 | 7/1965 | Brennemann | 340—173.1 |
| 3,181,126 | 4/1965 | Green | 340—173.1 |
| 3,259,887 | 7/1966 | Garwin | 340—173.1 |

TERRELL W. FEARS, *Primary Examiner.*

U.S. Cl. X.R.

307—277